United States Patent
Batta et al.

(10) Patent No.: US 7,499,411 B2
(45) Date of Patent: Mar. 3, 2009

(54) SYSTEM AND METHOD FOR PROVIDING AUTOMATIC LOAD BALANCING AND REDUNDANCY IN ACCESS PORT ADOPTION

(75) Inventors: Puneet Batta, Santa Clara, CA (US); Jason Dean Hatashita, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 660 days.

(21) Appl. No.: 11/140,352

(22) Filed: May 26, 2005

(65) Prior Publication Data

US 2006/0268741 A1 Nov. 30, 2006

(51) Int. Cl.
*H04L 12/28* (2006.01)
*H04B 7/00* (2006.01)
*H04Q 7/00* (2006.01)
*H04Q 7/24* (2006.01)

(52) U.S. Cl. ............... 370/254; 370/310; 370/328; 370/358

(58) Field of Classification Search ............... 370/254
See application file for complete search history.

(56) References Cited

U.S. PATENT DOCUMENTS

| | | | | |
|---|---|---|---|---|
| 6,658,479 B1 * | 12/2003 | Zaumen et al. | ............ | 709/238 |
| 6,754,843 B1 * | 6/2004 | Lu et al. | ............ | 714/4 |
| 7,190,678 B2 * | 3/2007 | Thubert et al. | ............ | 370/254 |
| 2003/0069990 A1 * | 4/2003 | D'Annunzio et al. | ....... | 709/242 |
| 2004/0246915 A1 * | 12/2004 | Watanabe | ............ | 370/313 |
| 2005/0025049 A1 * | 2/2005 | Martinot et al. | ............ | 370/229 |
| 2005/0063318 A1 * | 3/2005 | Xu et al. | ............ | 370/254 |
| 2005/0249131 A1 * | 11/2005 | Takahashi et al. | ............ | 370/254 |

FOREIGN PATENT DOCUMENTS

| WO | WO 03/033109 A | 4/2003 |
|---|---|---|
| WO | WO 2005/062580 A | 7/2005 |
| WO | WO 2005/104796 | 11/2005 |

OTHER PUBLICATIONS

Calhoun, P. et al.; Light Weight Access Point Protocol (LWAPP), draft-ohara-capwap-lwapp-02; Network Working Group, Mar. 31, 2005.*
PCT International Search Report PCT/US2006/020896, Oct. 19, 2006.
Calhoun, B. et al. Light Weight Access Point Protocol (LWAPP), draft-ohara-capwap-lwapp-02, Internet Engineering Task Force, Mar. 31, 2005.
Deering, S. et al, ICMP Router Discovery Messages; rfc1256.txt, Internet Engineering Task Force, Sep. 1991.

* cited by examiner

*Primary Examiner*—Daniel J Ryman
*Assistant Examiner*—Cassandra Decker
(74) *Attorney, Agent, or Firm*—Ingrassia, Fisher & Lorenz, P.C.

(57) ABSTRACT

A computer network as described herein includes multiple wireless switches cooperating with wireless access devices. The wireless access devices include intelligent processing that enables them to select a desired wireless switch for adoption. When in need of adoption, a wireless access device sends at least one SWITCH DISCOVER message over the network, the wireless switches reply with SWITCH OFFER messages, and the wireless access device processes the SWITCH OFFER messages to select a desired wireless switch for adoption. The SWITCH OFFER messages contain switch selection information associated with the respective wireless switches, and the wireless access device analyzes the switch selection information during the selection process.

12 Claims, 5 Drawing Sheets

SYSTEM AND METHOD FOR PROVIDING AUTOMATIC LOAD BALANCING AND REDUNDANCY IN ACCESS PORT ADOPTION

TECHNICAL FIELD OF THE INVENTION

The present invention relates generally to wireless local area networks. More particularly, the present invention relates to a technique for adopting wireless access ports by wireless switches in a wireless local area network.

BACKGROUND OF THE INVENTION

Wireless local area networks ("WLANs") can give clients the ability to "roam" or physically move from place to place without being connected by wires. In the context of a WLAN, the term "roaming" describes the act of physically moving between wireless access devices, which may be stand-alone wireless access points or wireless access ports that cooperate with one or more wireless switches located in the WLAN. Many deployments of wireless computer infrastructure, such as WLANs, involve the use of multiple wireless switches serving a number of wireless access devices. Conventional networks having multiple wireless switches and multiple wireless access devices do not automatically or intelligently distribute the access devices among the switches. Rather, upon initialization or reset of a wireless access device, one common adoption technique simply searches for the first available wireless switch that can adopt the access device. Although simple in design, this technique can lead to an uneven distribution of access devices among the switches.

Prior art WLANs may utilize access control lists that restrict certain wireless access devices from being adopted by a particular wireless switch. Configuring these access control lists is a manual, time consuming process, and the access control lists do not result in a dynamic or intelligent adoption scheme that provides automatic load balancing and redundancy. Indeed, such access control lists may actually prevent "backup" wireless switches from adopting wireless access devices that are adopted by a failed wireless switch. Thus, if one of the switches fails, the access devices supported by that switch may idle in a disconnected state, resulting in poor wireless coverage for client devices.

Accordingly, it is desirable to have an automatic and intelligent technique for the adoption of wireless access devices by wireless switches in a computer network. In addition, it is desirable to have an automatic adoption technique that results in load balancing among wireless switches in the computer network. It is also desirable to have an automatic adoption technique that provides redundancy in the event of failure of one of the wireless switches in the computer network. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

A system and method is provided for adopting wireless access devices by wireless switches on a computer network. The adoption technique automatically distributes wireless access devices among the wireless switches in a manner that results in load balancing and an efficient use of wireless switching resources. In this regard, a wireless access device can select a desired wireless switch from multiple available switches based upon specified selection criteria.

The above and other aspects of the invention may be carried out in one form by an adoption method for a wireless access device in a computer network. The method involves broadcasting a switch discover message over the computer network, receiving, in response to the switch discover message, switch offer messages associated with wireless switches on the computer network, processing the switch offer messages, and selecting a desired wireless switch for adoption.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION OF THE INVENTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to WLANs, data transmission, signaling, network control, wireless access device operation, wireless switch operation, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description may refer to elements or features being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the block diagrams depicted in the figures depict example arrangements of elements, additional intervening elements, devices, features, or components may be present in an actual embodiment (assuming that the functionality of the devices is not adversely affected).

Figure 1:
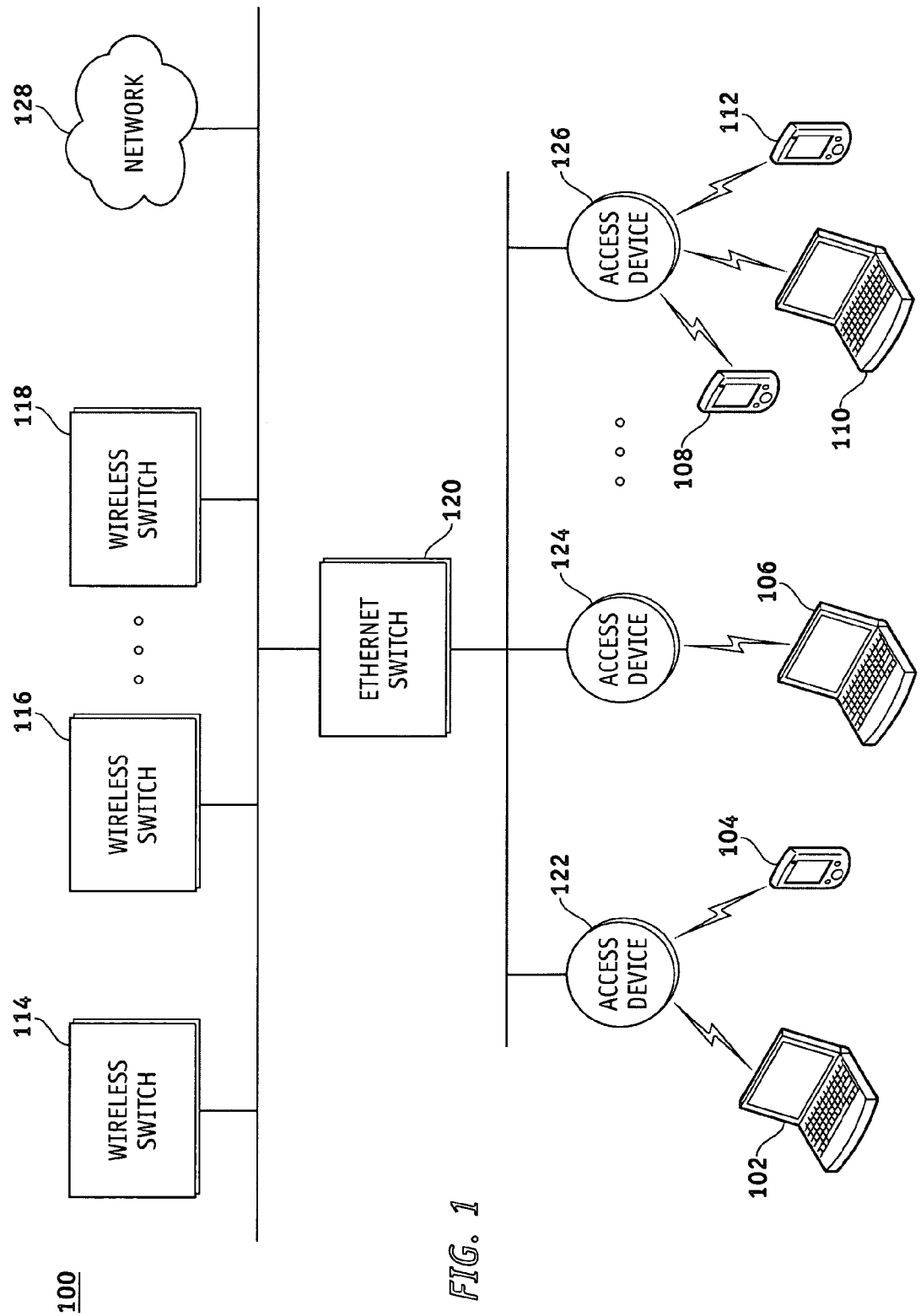
FIG. 1 is a schematic representation of a computer network configured in accordance with an example embodiment of the invention.

FIG. 1 is a schematic representation of a computer network 100 configured in accordance with an example embodiment of the invention. In this example, computer network 100 is configured as a WLAN. Computer network 100 generally includes wireless clients (identified by reference numbers 102, 104, 106, 108, 110, and 112), a number of wireless switches (identified by reference numbers 114, 116, and 118), an Ethernet switch 120, and a number of wireless access devices (identified by reference numbers 122, 124, and 126). Computer network 100 may also include or communicate with any number of additional network components, such as a traditional local area network ("LAN"). In FIG. 1, such additional network components are generally identified by reference number 128. A practical embodiment can have any number of wireless switches, each supporting any number of wireless access devices, and each wireless access device supporting any number of wireless clients. Indeed, the topology and configuration of computer network 100 can vary to suit the needs of the particular application and FIG. 1 is not intended to limit the application or scope of the invention in any way.

Wireless switches 114/116/118 are coupled to Ethernet switch 120, which is in turn coupled to wireless access devices 122/124/126. In practice, wireless switches 114/116/118 communicate with wireless access devices 122/124/126 via Ethernet switch 120. A given wireless switch can support any number of wireless access devices, i.e., one or more wireless access devices can be concurrently adopted by a single wireless switch (in the example embodiment, a wireless access device can be adopted by only one wireless switch at a time). The wireless clients are wireless devices that can physically move around computer network 100 and communicate with network components 128 via wireless access devices 122/124/126.

In one practical embodiment, wireless access devices 122/124/126 are realized as wireless access ports, which are "thin" devices that rely on the network intelligence and management functions provided by wireless switches 114/116/118. Wireless access ports having conventional features that can be incorporated into wireless access devices 122/124/126 are available from Symbol Technologies, Inc. Briefly, a wireless access device as described herein is suitably configured to receive data from wireless clients over wireless links. Once that data is captured by the wireless access device, the data can be processed for communication within computer network 100. For example, the data can be encapsulated into a packet format compliant with a suitable data communication protocol. In the example embodiment, data is routed within computer network 100 using conventional Ethernet 802.3 addressing (including standard Ethernet destination and source packet addresses). In alternate embodiments, data can be routed within computer network 100 using conventional Internet Protocol ("IP") techniques.

The technique described herein governs the way by which wireless access devices are adopted by wireless switches in a manner that results in automatic load balancing of the switches and redundancy. Briefly, when a wireless access device is powered up or reset, it broadcasts a SWITCH DISCOVER message (or sends a number of SWITCH DISCOVER messages) over the network. A SWITCH DISCOVER message informs a wireless switch that a wireless access device is ready and available. A wireless switch that receives the SWITCH DISCOVER message will respond with a SWITCH OFFER message. The SWITCH OFFER message indicates willingness on the part of the responding wireless switch to adopt the wireless access device that originated the SWITCH DISCOVER message. The SWITCH OFFER message may include information such as the number of wireless access devices already adopted by the wireless switch, the average utilization/load on the wireless switch, and/or whether the wireless switch is the preferred switch for the wireless access device that originated the SWITCH DISCOVER message. In practice, the wireless access device collects multiple SWITCH OFFER messages from multiple wireless switches (resending the SWITCH DISCOVER message if needed) and selects one of the wireless switches as a desired switch for adoption. To promote uniform distribution of wireless access devices among the wireless switches, each of the wireless access devices can send its respective SWITCH DISCOVER message after a random delay.

The wireless access device adoption scheme described herein allows the number of wireless access devices in the network to be evenly distributed across the wireless switches. In addition, the wireless access devices may employ selection criteria that favors lightly loaded switches over highly loaded switches. Furthermore, a wireless access device can be marked for adoption to a particular wireless switch, thus facilitating a deterministic distribution that can be configured by a network operator.

Figure 2:
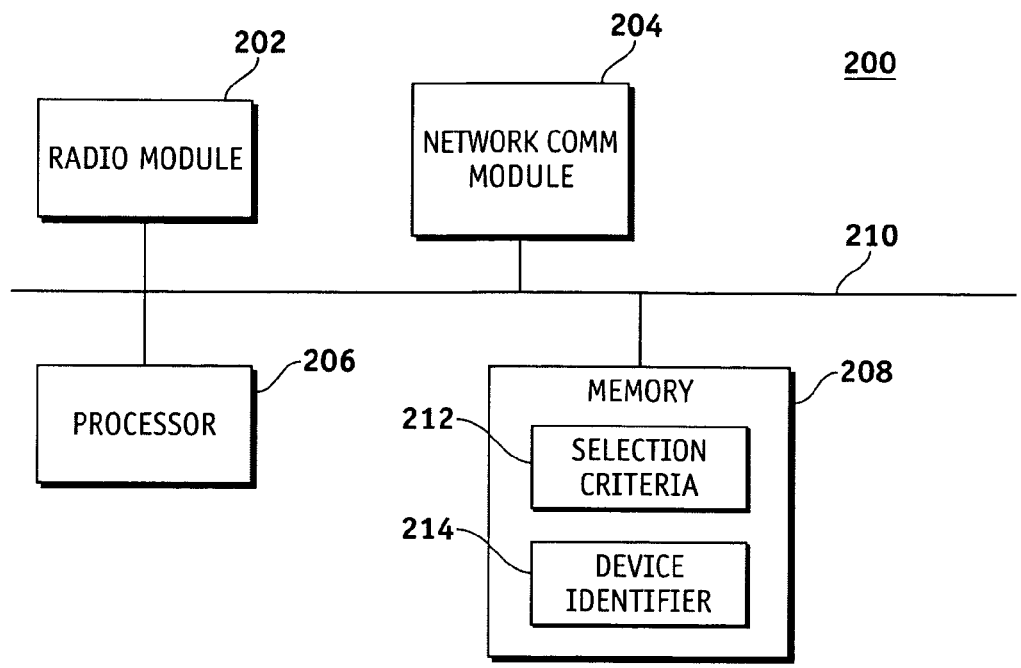
FIG. 2 is a schematic representation of a wireless access device configured in accordance with an example embodiment of the invention.

FIG. 2 is a schematic representation of a wireless access device 200 configured in accordance with an example embodiment of the invention. A practical embodiment of wireless access device 200 will include additional components and elements configured to support known or conventional operating features that need not be described in detail herein. In the example embodiment, wireless access device 200 is a wireless access port that transmits and receives data. An access port connects users to other users within the network and also can serve as the point of interconnection between a WLAN and a fixed wire network. Each access port can serve multiple users within a defined network area. As a wireless client moves beyond the range of one access port, the wireless client can be automatically handed over to another access port. In practice, the number of access ports in a given network generally increases with the number of network users and the physical size of the network.

Wireless access device 200 generally includes a radio module 202, a network communication module 204, a processor architecture 206, and memory 208. These and other elements of wireless access device 200 may be interconnected together using a bus 210 or any suitable interconnection arrangement. Such interconnection facilitates communication between the various elements of wireless access device 200. Radio module 202, which includes a receiver and a transmitter (or a transceiver), is configured to communicate with wireless clients via a wireless data communication link. In the example embodiment, radio module 202 is configured to support WLAN connectivity in compliance with established IEEE Standards, such as 802.11a, 802.11b, and 802.11a/b. Of course, radio module 202 may be configured to support alternate or additional wireless data communication protocols, including future variations of 802.11 such as 802.11a/b/g.

Network communication module 204 generally represents the hardware, software, firmware, processing logic, and/or other components of wireless access device 200 that enable bi-directional communication between wireless access device 200 and network components to which wireless access device 200 is connected. Referring to FIG. 1 as an example, network communication module 204 is suitably configured to transmit messages to components on computer network 100 (such as wireless switches 114/116/118, Ethernet switch 120, and/or additional network components 128), and to receive messages from components on computer network 100. In a typical deployment, network communication module 204 provides an Ethernet interface such that wireless access device 200 can communicate with a conventional Ethernet-based computer network. In this regard, network communication module 204 may include a physical interface for connection to the computer network, and network communication module 204 (and/or processor 206) may handle Ethernet addressing for data packets sent from wireless access device 200. Network communication module 204 may also be configured to support IP network communications.

Processor architecture 206 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

As depicted in FIG. 2, processor architecture 206 is in communication with network communication module 204. In this example, processor architecture 206 is also in communication with radio module 202 and memory 208. Processor architecture 206 preferably includes processing logic that is configured to carry out the techniques and processing tasks described in more detail below.

Memory 208 may be implemented or realized with RAM memory, flash memory, ROM memory, EPROM memory, EEPROM memory, registers, a hard disk, a removable disk, a CD-ROM, or any other form of storage medium known in the art. In this regard, memory 208 can be coupled to processor architecture 206 such that processor architecture 206 can read information from, and write information to, memory 208. In the alternative, memory 208 may be integral to processor architecture 206. As an example, processor architecture 206 and memory 208 may reside in a suitably configured ASIC.

Memory 208 includes sufficient data storage capacity to support the operation of wireless access device 200. In the example embodiment described herein, memory 208 is configured to store selection criteria 212 that influences the selection of an adopting wireless switch. Selection criteria 212 and its use are described in more detail below. Memory 208 may also be configured to store a device identifier 214 that uniquely identifies wireless access device 200 within the network environment. In practical embodiments, device identifier 214 may represent the source address, serial number, network location, or any resolvable identification for wireless access device 200. Device identifier 214 and its use are described in more detail below.

Figure 3:
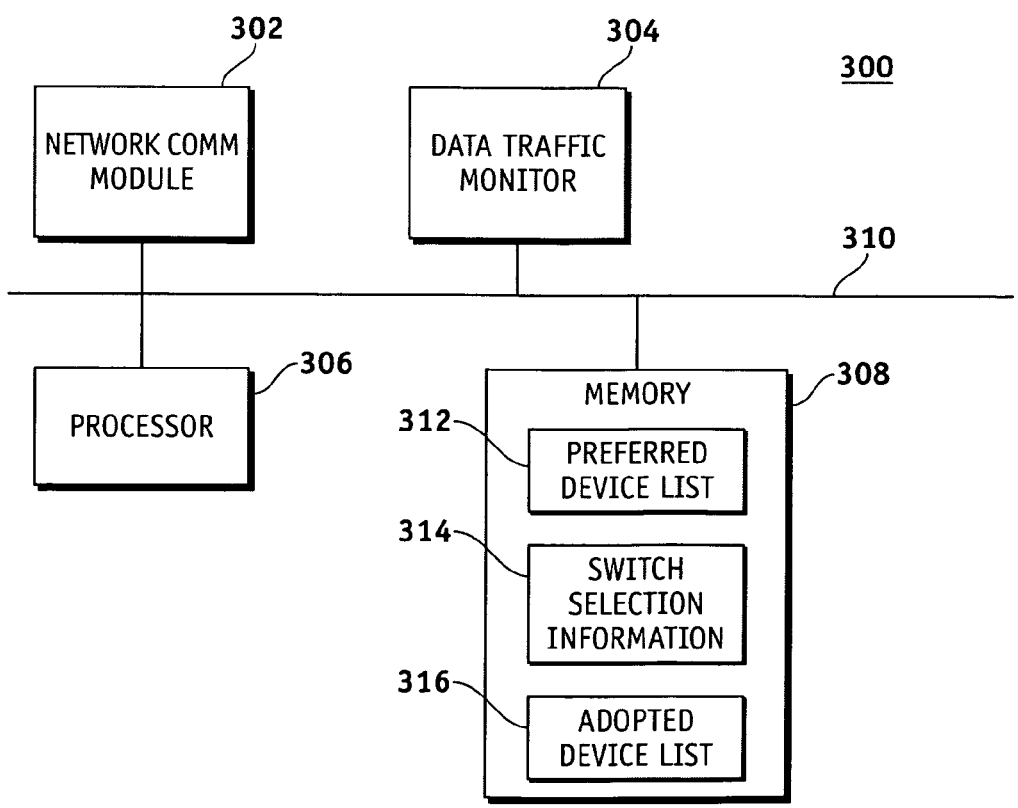
FIG. 3 is a schematic representation of a wireless switch configured in accordance with an example embodiment of the invention.

FIG. 3 is a schematic representation of a wireless switch 300 configured in accordance with an example embodiment of the invention. A practical embodiment of wireless switch 300 will include additional components and elements configured to support known or conventional operating features that need not be described in detail herein. In the example embodiment, wireless switch 300 contains intelligence and processing logic that facilitates centralized control and management of WLAN elements, including wireless access devices adopted by wireless switch 300. In this regard, one wireless switch 300 can support any number of wireless access devices (limited only by practical considerations); a supported wireless access device is "adopted" by the respective wireless switch 300. Thus, each wireless switch 300 can serve multiple wireless access devices, which in turn can serve multiple wireless clients. Wireless switch 300 is suitably configured to transmit and receive data, and it may serve as a point of interconnection between a WLAN and a fixed wire network. In practice, the number of wireless switches 300 in a given network generally increases with the number of network users and the physical size of the network.

Wireless switch 300 generally includes a network communication module 302, a data traffic monitor 304, a processor architecture 306, and memory 308. These and other elements of wireless switch 300 may be interconnected together using a bus 310 or any suitable interconnection arrangement. Such interconnection facilitates communication between the various elements of wireless switch 300. Network communication module 302 generally represents the hardware, software, firmware, processing logic, and/or other components of wireless switch 300 that enable bi-directional communication between wireless switch 300 and network components to which wireless switch 300 is connected. Referring to FIG. 1 as an example, network communication module 302 is suitably configured to transmit messages to components on computer network 100 (such as wireless access devices 112/124/126, Ethernet switch 120, and/or additional network components 128), and to receive messages from components on computer network 100. In a typical deployment, network communication module 302 provides an Ethernet interface such that wireless switch 300 can communicate with a conventional Ethernet-based computer network. In this regard, network communication module 302 may include a physical interface for connection to the computer network, and network communication module 302 (and/or processor 306) may handle Ethernet addressing for data packets sent from wireless switch 300. Network communication module 302 may also be configured to support IP network communications.

Data traffic monitor 304 is configured to monitor the flow or amount of data processed by wireless switch 300. Data traffic monitor 304 may be implemented or performed with a processor architecture 306, a content addressable memory, a digital signal processor, an application specific integrated circuit, a field programmable gate array, any suitable programmable logic device, discrete gate or transistor logic, discrete hardware components, or any combination thereof, designed to perform the functions described below.

Data traffic monitor 304 can monitor the data rate, the data volume, an average data rate, an average data volume, or any quantity or characteristic based upon empirical or statistical information. The monitored data throughput may be unidirectional or bidirectional, depending upon the specific application. In practice, data traffic monitor 304 may continuously update and store an average data rate or a total data volume for a predetermined period of history, e.g., the last 30 minutes. As described in more detail below, the information obtained by data traffic monitor 304 can be utilized by a wireless access device to select a desired wireless switch for adoption.

Processor architecture 306 can be realized in the manner described above in connection with processor architecture 206. As depicted in FIG. 3, processor architecture 306 is in communication with network communication module 302, data traffic monitor 304, and memory 308. Processor architecture 306 preferably includes processing logic that is configured to carry out the techniques and processing tasks described in more detail below.

Memory 308 may be implemented or realized in the manner described above in connection with memory 208. Memory 308 includes sufficient data storage capacity to support the operation of wireless switch 300. In the example embodiment described herein, memory 308 is configured to store at least a preferred device list or table 312, switch selection information 314, and an adopted device list or table 316. Preferred device list 312 may represent a list of wireless access devices that are designated as "preferred" for the particular wireless switch 300. Thus, wireless switch 300 can be configured such that the adoption of certain designated wireless access devices will take priority over the adoption of other wireless access devices. In other words, preferred device list 312 enables a network operator to override the otherwise automatic adoption scheme described herein.

Switch selection information 314 generally represents information, data, characteristics, and/or performance statistics associated with wireless switch 300 that can be utilized by wireless access devices to select a desired wireless switch for adoption. In this manner, a wireless access device can intelligently select a wireless switch for adoption based upon one or more factors, including current operating conditions of wireless switch 300 and current operating conditions of the computer network itself. In the practical embodiment, switch selection information 314 may include, without limitation: a preference designator (which indicates whether wireless switch 300 is preferred for a particular wireless access device); a load designator (which indicates a loading condition for wireless switch 300); and/or a data traffic designator (which indicates a data throughput condition for wireless switch 300). The processing of switch selection information 314 by a wireless access device is described in more detail below.

Adopted device list 316 may represent a list of wireless access devices that are currently adopted by wireless switch 300. In practice, adopted device list 316 can include the device identifiers for the respective wireless access devices. As mentioned above, these device identifiers uniquely identify the adopted wireless access devices, and the device identifiers may represent, for example, the source address, serial number, network location, or any resolvable identification for the wireless access devices. Adopted device list 316 may also maintain a count corresponding to the number of wireless access devices currently adopted by wireless switch 300. This count may be utilized in connection with the load designator (described above in connection with switch selection information 314) to identify the current loading condition of wireless switch 300.

Figure 4:
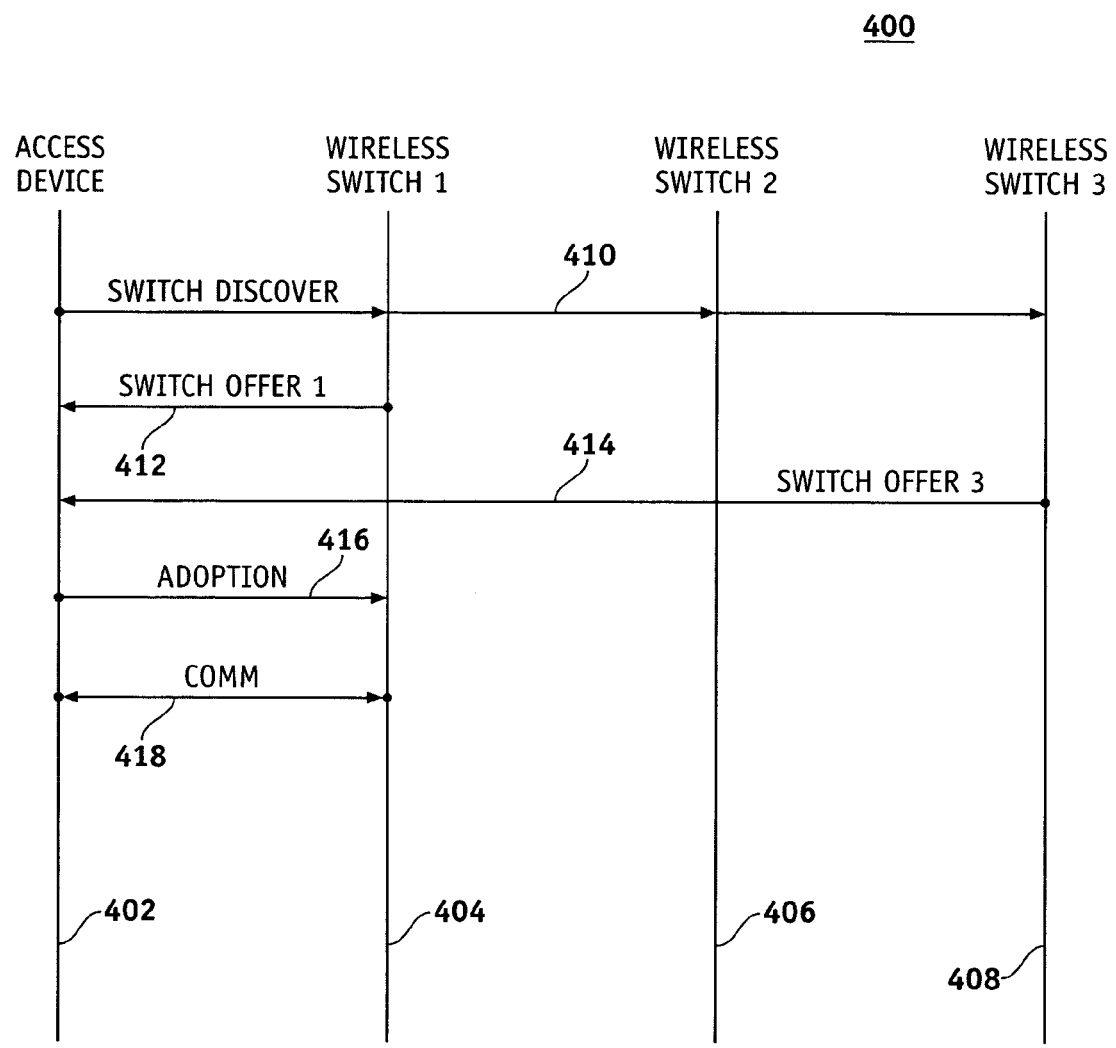
FIG. 4 is a message diagram depicting an example communication session that may be carried out by components in the computer network shown in FIG. 1.
Figure 5:
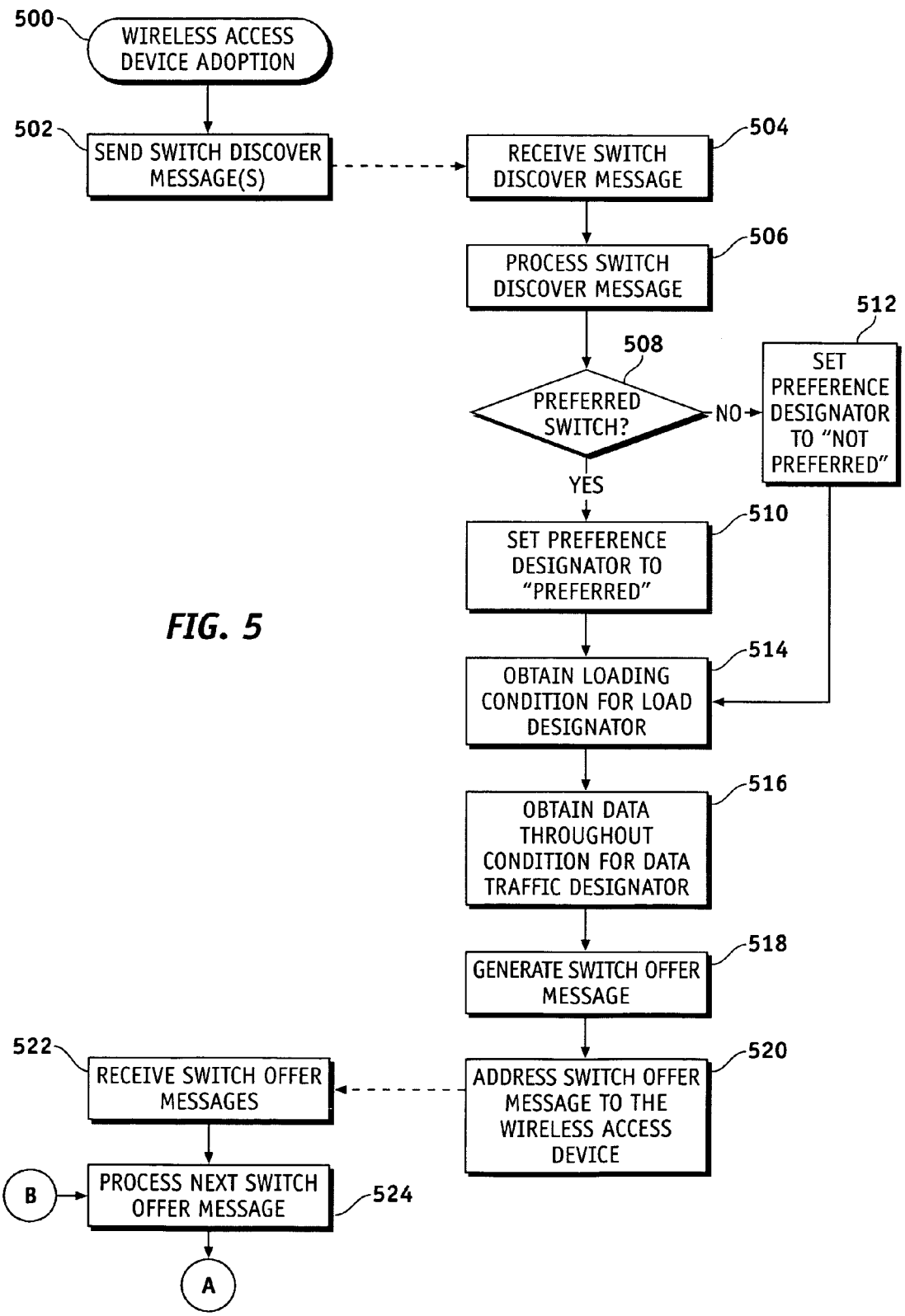
FIGS. 5 and 6 represent a flow diagram of an example wireless access device adoption process that may be carried out by components in the computer network shown in FIG. 1.
Figure 6:
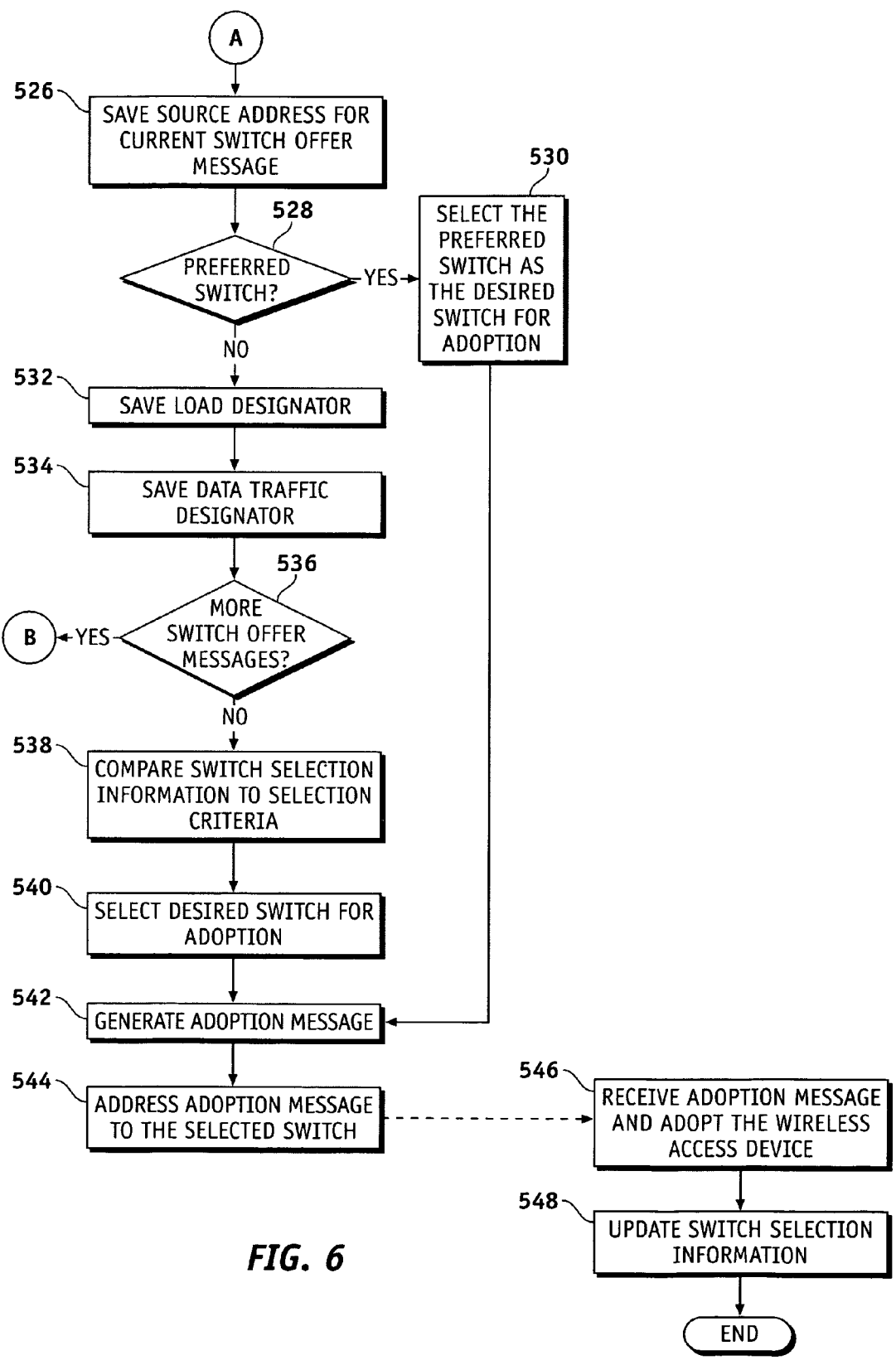

FIG. 4 is a message diagram 400 depicting an example communication session that may be carried out by components in the computer network shown in FIG. 1, and FIGS. 5 and 6 represent a flow diagram of an example wireless access device adoption process 500 that may be carried out in conjunction with the communication session depicted in FIG. 4. Message diagram 400 is arranged in chronological order, with time progressing from the top to the bottom. In this simplified example, one wireless access device 402 is depicted, along with three wireless switches 404/406/408. This simplified arrangement facilitates the following description of the example communication session, and is not intended to limit the scope or application of the invention in any way.

The various tasks performed in connection with process 500 may be performed by software, hardware, firmware, or any combination thereof. For illustrative purposes, the following description of process 500 may refer to elements mentioned above in connection with FIGS. 1-3. In practical embodiments, portions of process 500 may be performed by different elements of the described network, e.g., a wireless switch, a wireless access device, or the like. It should be appreciated that process 500 may include any number of additional or alternative tasks, the tasks shown in FIGS. 5 and 6 need not be performed in the illustrated order, and process 500 may be incorporated into a more comprehensive procedure or process having additional functionality not described in detail herein.

Wireless access device adoption process 500 assumes that the computer network includes at least two wireless switches. In the preferred embodiment, process 500 is initiated whenever a wireless access device on the network is powered up, connected, initialized, reset, or the like. For example, process 500 may be initiated in connection with the introduction of a new wireless access device into the network, after an existing wireless access device loses connectivity with a wireless switch, after an existing wireless access device is shut down and powered up again, or upon power up of the network itself.

Process 500 may begin with the generation of one or more SWITCH DISCOVER messages, followed by the broadcasting or sending of the SWITCH DISCOVER message(s) over the computer network by wireless access device 402 (task 502). In one practical embodiment, task 502 is associated with the broadcasting of a single SWITCH DISCOVER message over the computer network. Some network communication protocols, however, do not allow messages to be broadcast across networks. For example, such broadcasting is not supported by IP. In such networks, therefore, task 502 may be associated with the generation and sending of a number of SWITCH DISCOVER messages that are individually directed to potential wireless switches that can adopt the wireless access device. In this regard, the wireless access device would employ a suitable technique to obtain or discover a list of potential wireless switches in an IP network. For example, the wireless access device may obtain the list from a DHCP server, which can provide the information using DHCP-Options fields. As another example, the wireless access device may be designed to perform a DNS lookup of a well-known name or a configured name, such as "Symbol-Wireless-Switch." In response, the DNS server can provide a list of the IP addresses of all candidate wireless switches in the network.

The example described herein assumes that the SWITCH DISCOVER message is broadcast over the network. An equivalent methodology, however, can be implemented for IP networks that do not support broadcast messages. Although FIG. 4 only depicts the broadcasting of the SWITCH DISCOVER message to wireless switches 404/406/408, the SWITCH DISCOVER message is actually broadcast over the computer network for potential reception by any number of network components. One practical embodiment employs conventional Layer 2 Ethernet broadcast techniques to accomplish task 502.

In accordance with the example embodiment described herein, the SWITCH DISCOVER message includes an identifier for wireless access device 402. This identifier may be, for example, a source address, a serial number, a network location, or any resolvable identification for wireless access device 402. The SWITCH DISCOVER message also includes data or information indicative of its functionality. In other words, the SWITCH DISCOVER message includes data or information that can be recognized and processed by compatible wireless switches on the computer network in the manner described herein. In this regard, the SWITCH DISCOVER message may inform the compatible wireless switches that wireless access device 402 is seeking a wireless switch for adoption. In practice, the SWITCH DISCOVER message may be configured such that it is disregarded, ignored, or not received by certain network components (for example, network components other than wireless switches).

Eventually, one or more wireless switches receive the SWITCH DISCOVER message over the computer network (task 504). For ease of illustration, the flow chart of FIGS. 5 and 6 is separated into two sections connected by dashed arrows; the blocks on the left side of FIGS. 5 and 6 represent tasks that are typically performed by a wireless access device, and the blocks on the right side of FIGS. 5 and 6 represent tasks that are typically performed by each compatible wireless switch. FIG. 4 depicts the broadcasting of a SWITCH DISCOVER message 410 and the receipt of that message by wireless switches 404/406/408.

After receiving the SWITCH DISCOVER message, a compatible wireless switch will process the SWITCH DISCOVER message in an appropriate manner (task 506). Such processing may, for example, interpret the SWITCH DISCOVER message to obtain its meaning in the context of the computer network. In other words, the wireless switch has the intelligence to determine that this particular message is a SWITCH DISCOVER message rather than some other message or piece of information. Such processing may also include, for example, an extraction of the identifier for wireless access device 402 from the SWITCH DISCOVER message and/or some other procedure that identifies wireless access device 402.

In the example embodiment, the wireless switch determines whether the SWITCH DISCOVER message originated from a preferred wireless access device (query task 508). In practice, the wireless switch may analyze the identifier contained in the SWITCH DISCOVER message and compare the identifier to a list of preferred devices (see above description of wireless switch 300). If the originating wireless access device 402 is a preferred device for the wireless switch, then the wireless switch may set a preference designator to indicate that wireless access device 402 is preferred (task 510). In a practical embodiment, the wireless switch may set a bit, a byte, a field, or any suitable data group to indicate a "preferred" state. If the originating wireless access device 402 is not a preferred device for the wireless switch, then the wireless switch may set a preference designator to indicate that wireless access device 402 is not preferred (task 512). In a practical embodiment, the wireless switch may set a bit, a byte, a field, or any suitable data group to indicate a "not preferred" state.

In addition to the preference designator, the wireless switch may obtain a loading condition for use with a load designator for the wireless switch (task 514). As mentioned above, the loading condition may represent the current number of devices supported by the wireless switch. Thus, in a practical embodiment, the load designator may be indicative of a numerical count, a percentage of maximum load capacity, or any suitable measurement of the current loading condition. The load designator can be realized as a number of bits, a byte, a field, or any suitable data group.

The wireless switch may also obtain a data throughput condition for use with a data traffic designator for the wireless switch (task 516). As mentioned above in connection with data traffic monitor 304 (see FIG. 3), the data throughput condition may represent the data rate, the data volume, an average data rate, an average data volume, or any quantity or characteristic based upon empirical or statistical information for the wireless switch. Thus, in a practical embodiment, the data traffic designator may be indicative of the amount of data processed by the wireless switch during a recent time period, or any suitable measurement of the data flow through the wireless switch. The data traffic designator can be realized as a number of bits, a byte, a field, or any suitable data group.

The preference designator, the load designator, the data traffic designator, and possibly other data or information associated with (or maintained by) the wireless switch are individually and collectively referred to herein as "switch selection information." In this regard, the switch selection information may include variable information that changes in response to the changing operating conditions of the wireless switch and the computer network. The wireless switch generates a suitably configured SWITCH OFFER message (task 518) that indicates the willingness of the wireless switch to adopt the originating wireless access device 402. In the example embodiment, the SWITCH OFFER message includes the switch selection information and an identifier for the wireless switch. This identifier may be, for example, a source address, a serial number, a network location, or any resolvable identification for the wireless switch.

The wireless switch may then address the SWITCH OFFER message to the originating wireless access device 402 (task 520) such that the SWITCH OFFER message can be properly routed back to wireless access device 402 over the computer network. Tasks 504-520 can be performed by any number of compatible wireless switches in the computer network in response to the broadcasting of a single SWITCH DISCOVER message, however, FIG. 5 only depicts one iteration of this processing for the sake of clarity and simplicity.

In response to the SWITCH DISCOVER message, wireless access device 402 receives a number (M) of SWITCH OFFER messages associated with a number (N) of wireless switches on the computer network (task 522). In this context, M can be any number, including zero, that is less than or equal to N. For example, if all of the wireless switches on the network are compatible with wireless access device adoption process 500, and all of the wireless switches perform tasks 504-520, then wireless access device 402 can receive N SWITCH OFFER messages in response to a single SWITCH DISCOVER message broadcast over the network. FIG. 4, however, depicts a situation where wireless switch 404 generates a SWITCH OFFER message 412, wireless switch 408 generates a SWITCH OFFER message 414, and wireless switch 406 does not respond to the SWITCH DISCOVER message. This situation might indicate that wireless switch 406 is incompatible with process 500, that wireless switch 406 is explicitly configured to not adopt the particular originating wireless access device 402, that wireless switch 406 did not properly receive the SWITCH DISCOVER message, that wireless access device 402 did not properly receive a SWITCH OFFER message from wireless switch 406, or the like. A practical wireless access device may utilize a short delay period after broadcasting the SWITCH DISCOVER message to ensure that it has time to receive all of the SWITCH OFFER messages, which may be generated by multiple wireless switches.

Eventually, the originating wireless access device 402 begins to process the collected SWITCH OFFER messages; wireless access device 402 can arbitrarily select the next SWITCH OFFER message for processing (task 524). In connection with such processing, wireless access device 402 may save the source address or other identifier for the current SWITCH OFFER message (task 526). Wireless access device 402 may also process and analyze the switch selection information contained in the current SWITCH OFFER message as described in more detail below.

In the example embodiment, wireless access device 402 determines whether the current SWITCH OFFER message originated from a preferred wireless switch (query task 528). In this regard, wireless access device 402 may consult the preference designator contained in the current SWITCH OFFER message. If wireless access device 402 determines that the current SWITCH OFFER message originated from a preferred switch, then wireless access device 402 will select that preferred switch as the desired switch for adoption (task 530). In this manner, wireless access device 402 can employ selection criteria that favors preferred wireless switches over non-preferred wireless switches. This enables a network operator to designate default relationships between wireless switches and wireless access devices as necessary. If a preferred wireless switch is selected, then task 530 leads to a task 542 (described below).

If query task 528 determines that the current SWITCH OFFER message originated from a non-preferred wireless switch, then wireless access device 402 may save the load designator (task 532) and the data traffic designator (task 534) included in the current SWITCH OFFER message. These designators are preferably maintained for comparison to like designators contained in other SWITCH OFFER messages. If more SWITCH OFFER messages remain unprocessed (query task 536), then wireless access device adoption process 500 can be re-entered at task 524 such that the next SWITCH OFFER message is processed as described above. If all of the SWITCH OFFER messages have been processed, then wireless access device 402 can compare the switch selection information (e.g., the load designators and/or the data traffic designators from the various SWITCH OFFER messages) to selection criteria maintained by wireless access device 402 (task 538).

In the practical embodiment, the selection criteria influences the selection of a desired wireless switch from among the wireless switches that originated the SWITCH OFFER messages. For example, the selection criteria may favor lightly loaded wireless switches over heavily loaded wireless switches. As another example, the selection criteria might favor light data traffic wireless switches over heavy data traffic wireless switches. The selection criteria may also be prioritized to give more weight to certain operating characteristics of the computer network. In one example embodiment, a preferred wireless switch will have priority over all other wireless switches regardless of the load conditions and regardless of the data traffic conditions. If no responding wireless switch is a preferred switch, however, then wireless access device 402 will select the wireless switch having the lightest current loading. If, however, the lightest load condition is shared by two wireless switches, then wireless access device 402 will select (from those two wireless switches) the wireless switch having the least amount of data traffic activity.

After consulting the selection criteria and analyzing the switch selection information, wireless access device 402 can select a desired switch for adoption (task. 540). Once a desired switch has been selected, wireless access device 402 can generate an ADOPTION message for the desired switch (task 542) and address the ADOPTION message to the selected switch (task 544). In practice, wireless access device 402 may leverage known techniques and protocols to generate, format, and address the ADOPTION message.

In response to the generation of its SWITCH OFFER message, the selected wireless switch receives the ADOPTION message, processes the message, and adopts wireless access device 402 (task 546). FIG. 4 depicts an example where an ADOPTION message 416 is addressed to, and received by, wireless switch 404. The selected wireless switch will process the ADOPTION message in an appropriate manner (possibly utilizing conventional techniques) to support wireless access device 402 and to establish communication between wireless access device 402 and the selected wireless switch. FIG. 4 depicts this communication with reference number 418. In response to such adoption, the selected wireless switch may update its switch selection information and/or update its adopted device list to reflect the additional load (task 548).

If communication between the selected wireless switch and wireless access device 402 is interrupted, then wireless access device adoption process 500 can be repeated to ensure that wireless access device 402 is re-adopted. In a practical embodiment, a wireless access device may be configured to periodically rebroadcast a SWITCH DISCOVER message during normal operation. Such periodic rebroadcasts may be desirable to dynamically optimize the allocation of wireless access devices to wireless switches throughout the computer network.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. In a computer network, an adoption method for a wireless access device, said method comprising:

broadcasting a switch discover message over the computer network;

receiving, in response to said switch discover message, M switch offer messages associated with N wireless switches on the computer network, each of said switch offer messages comprising a preference designator that indicates whether or not the respective wireless switch is preferred for the wireless access device, and each of said switch offer messages comprising switch selection information that is utilized by the wireless access device to select one of said wireless switches for adoption;

processing said preference designators and said switch selection information in said switch offer messages;

if the preference designator of one of said switch offer messages indicates a preferred wireless switch, selecting said preferred wireless switch for adoption regardless of said switch selection information; and if the preference designators of said switch offer messages indicate no preferred wireless switch, selecting a desired wireless switch for adoption based upon said switch selection information.

2. A method according to claim 1, wherein M is less than or equal to N.

3. A method according to claim 1, wherein processing said preference designators and said switch selection information comprises analyzing said switch selection information.

4. A method according to claim 3, further comprising comparing said switch selection information to selection criteria, wherein selecting said desired wireless switch is influenced by said selection criteria.

5. A method according to claim 4, said selection criteria favoring preferred wireless switches over non-preferred wireless switches.

6. A method according to claim 4, said selection criteria favoring lightly loaded wireless switches over heavily loaded wireless switches.

7. A method according to claim 4, said selection criteria favoring light data traffic wireless switches over heavy data traffic wireless switches.

8. A method according to claim 1, further comprising generating an adoption message for said desired wireless switch or for said preferred wireless switch.

9. A wireless access device for a computer network, said wireless access device comprising:
   a network communication module configured to transmit messages to components on the computer network, and to receive messages from components on the computer network; and
   processing logic in communication with said network communication module, said processing logic being configured to:
   generate one or more switch discover messages for sending over the computer network;
   receive, in response to said one or more switch discover messages, M switch offer messages associated with N wireless switches on the computer network, each of said switch offer messages comprising a preference designator that indicates whether or not the respective wireless switch is preferred for the wireless access device, and each of said switch offer messages comprising switch selection information that is utilized by the wireless access device to select one of said wireless switches for adoption;
   process said switch offer messages;
   if the preference designator of one of said switch offer messages indicates a preferred wireless switch, select said preferred wireless switch for adoption regardless of said switch selection information; and
   if the preference designators of said switch offer messages indicate no preferred wireless switch, select, from said wireless switches, a desired wireless switch for adoption.

10. A wireless access device according to claim 9, wherein said processing logic is configured to analyze said switch selection information.

11. A wireless access device according to claim 10, said processing logic being configured to compare said switch selection information to selection criteria, wherein selecting said desired wireless switch is influenced by said selection criteria.

12. A wireless access device according to claim 9, said processing logic being configured to generate an adoption message for said desired wireless switch or for said preferred wireless switch.

* * * * *